(12) United States Patent
Ohwa et al.

(10) Patent No.: US 11,556,849 B2
(45) Date of Patent: Jan. 17, 2023

(54) OPTIMIZATION APPARATUS, NON-TRANSITORY COMPUTER-READABLE STORAGE MEDIUM FOR STORING OPTIMIZATION PROGRAM, AND OPTIMIZATION METHOD

(71) Applicant: FUJITSU LIMITED, Kawasaki (JP)

(72) Inventors: Takuya Ohwa, Shinagawa (JP); Hidetoshi Matsuoka, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 468 days.

(21) Appl. No.: 16/690,335

(22) Filed: Nov. 21, 2019

(65) Prior Publication Data

US 2020/0184375 A1  Jun. 11, 2020

(30) Foreign Application Priority Data

Dec. 11, 2018 (JP) .............................. JP2018-231731

(51) Int. Cl.
*G06F 17/00* (2019.01)
*G06N 20/00* (2019.01)
(Continued)

(52) U.S. Cl.
CPC ............. *G06N 20/00* (2019.01); *G06F 17/18* (2013.01); *G06F 30/20* (2020.01); *G06F 2111/10* (2020.01)

(58) Field of Classification Search
CPC .................. G06F 30/27; G06N 3/086
(Continued)

(56) References Cited

U.S. PATENT DOCUMENTS

2015/0006443 A1   1/2015  Rose et al.
2016/0187446 A1   6/2016  Zhou et al.
2021/0357555 A1*  11/2021  Liu .................. G06F 30/27

FOREIGN PATENT DOCUMENTS

JP    2005-222422    8/2005
JP    2016-123853    7/2016
(Continued)

OTHER PUBLICATIONS

R. Tibshirani, "Regression Shrinkage and Selection via the Lasso", Journal of the Royal Statistical Society, Series B, vol. 58, No. 1, pp. 267-288, 1996.
(Continued)

*Primary Examiner* — Andy Ho
(74) *Attorney, Agent, or Firm* — Fujitsu Patent Center

(57) ABSTRACT

A method includes: partitioning learning data containing objective variables and explanatory variables into a plurality of subsets of data; executing regularization processing on first data in each of the partitioned subsets, and extracting a first element equal to zero; extracting, as a candidate, each model where an error ratio between first multiple regression and second multiple regression is equal to or more than a predetermined value, the first multiple regression being a result of multiple regression on second data which is test data in each of the partitioned subsets and is for use to calculate the error ratio of the learning data, the second multiple regression being a result of multiple regression on third data obtained by excluding the first element from the second data; and outputting a model where zero is substituted for an element that takes zero a predetermined or larger number of times in the candidate.

6 Claims, 11 Drawing Sheets

(51) Int. Cl.
   G06F 30/20    (2020.01)
   G06F 17/18    (2006.01)
   G06F 111/10   (2020.01)

(58) Field of Classification Search
   USPC .............................................. 703/2; 706/12
   See application file for complete search history.

(56) References Cited

FOREIGN PATENT DOCUMENTS

JP    2016-531343        10/2016
WO    2014/210368 A1    12/2014

OTHER PUBLICATIONS

Neven, Hartmut et al., "Training a Binary Classifier with the Quantum Adiabatic Algorithm", arxiv.org, Cornell University Library, 201 Olin Library Cornell University Ithaca, NY 14853, pp. 1-11, Nov. 4, 2008, XP080439029.

Denchev, Vasil et al., "Robust Classification with Adiabatic Quantum Optimization", CORR(ARXIV), vol. 1205.1148, No. v2, 17 pages, May 30, 2012, XP055579010.

Nguyen, Nga T. et al., "Image classification using quantum inference on the D-Wave 2X", 2018 IEEE International Conference on Rebooting Computing (ICRC), IEEE, 7 pages, Nov. 7, 2018 [retrieved on Feb. 8, 2019], XP033516478.

Aramon, Maliheh et al., "Physics-Inspired Optimization for Quadratic Unconstrained Problems Using a Digital Annealer", arxiv.org, Cornell University Library, 201 Olin Library Cornell University Ithaca, NY 14853, pp. 1-15, Aug. 11, 2018, XP081093403.

Extended European Search Report dated May 12, 2020 for corresponding European Patent Application No. 19211445.2, 9 pages.

European Office Action dated Dec. 7, 2022 for corresponding European Patent Application No. 19211445.2, 7 pages. *Please note D1 NPL "Hartmut Neven et al: "Training a Binary Classifier with the Quantu, Adiabatic Algorithm"," cited herewith, was previously cited in an IDS filed on Aug. 3, 2020.*

* cited by examiner

FIG. 5

$$y^{(i)} = \begin{pmatrix} y_1^{(i)} \\ \vdots \\ \hline y_m^{(i)} \end{pmatrix}, X^{(i)} = \begin{pmatrix} x_{11}^{(i)} & \cdots & x_{1n}^{(i)} \\ \vdots & \ddots & \vdots \\ \hline x_{m1}^{(i)} & \cdots & x_{mn}^{(i)} \end{pmatrix} \begin{matrix} \}\text{Train} \Rightarrow \text{DA} \\ \\ \}\text{Test} \end{matrix}$$

FIG. 6

$$X^{(i)} = \begin{pmatrix} x_{11}^{(i)} & \cdots & x_{1j}^{(i)} & \cdots & x_{1n}^{(i)} \\ \vdots & & \ddots & & \vdots \\ x_{m1}^{(i)} & & x_{mj}^{(i)} & & x_{mn}^{(i)} \end{pmatrix} \begin{matrix} \}\text{Train} \\ \\ \}\text{Test} \end{matrix}$$

MULTIPLE REGRESSION WITH
THIS ELEMENT EXCLUDED

FIG. 8

$$\tilde{\beta}^{(1)} = (0, 0, x, y, 0, \cdots, 0)$$

$$\tilde{\beta}^{(2)} = (z, 0, w, y, 0, \cdots, 0)$$

$$\vdots \qquad \vdots$$

$$\tilde{\beta}^{(K)} = (0, 0, x, y, 0, \cdots, 0)$$

ELEMENT TAKES 0 N OR LARGER NUMBER OF TIMES IN $\tilde{\beta}$
$\Rightarrow \beta_i = 0$

OPTIMIZATION APPARATUS, NON-TRANSITORY COMPUTER-READABLE STORAGE MEDIUM FOR STORING OPTIMIZATION PROGRAM, AND OPTIMIZATION METHOD

CROSS-REFERENCE TO RELATED APPLICATION

This application is based upon and claims the benefit of priority of the prior Japanese Patent Application No. 2018-231731, filed on Dec. 11, 2018, the entire contents of which are incorporated herein by reference.

FIELD

The embodiments discussed herein are related to an optimization apparatus, a non-transitory computer-readable storage medium for storing an optimization program, and an optimization method.

BACKGROUND

Heretofore, in supervised learning of creating a learning model (hereinafter also simply referred to as a "model") from learning data, the learning data is often required to has sparsity in terms of data characteristics for estimating a true model ($\beta$) by using multiple regression ($y = X\beta + \xi$).

In the multiple regression equation, y is an objective variable contained in the learning data, and is, for example, a meaning of an image in image data for learning ("2" in an image on which a figure "2" is drawn). Then, X is an explanatory variable contained in the learning data, and is, for example, the image (pixel) in the image data for learning. Further, $\beta$ is a learning model, and $\xi$ is noise contained in the learning data.

FIG. 11 is an explanatory view for describing why the sparsity is required for the multiple regression. As illustrated in FIG. 11, in case C1, noise is removed and pixels other than the pixels corresponding to y="2" are "0". Thus, the places which the model ($\beta$) has to see in the multiple regression are limited to the pixels of x corresponding to y="2". As a result, a highly accurate model where y="2" holds is obtained. In contrast, in case C2, the model ($\beta$) also sees noise ($\xi$) in the multiple regression undesirably and a model with low accuracy is obtained.

To satisfy this requirement for the sparsity, noise and so on are removed from the learning data by performing a sparse estimation of extracting a portion where data is sparse (for example, most of the values are a constant ($\approx 0$)). In the learning involving such a sparse estimation, solved is an optimization problem specified in the following Formula (1), in which the normalization term is added to a prediction error.

$$\min_{\beta} \|y - X\beta\|_2^2 + \lambda \|\beta\|_0 \quad (1)$$

$$\begin{pmatrix} y = \begin{pmatrix} y_1 \\ \vdots \\ y_m \end{pmatrix} & \text{Learning data (objective variables)} \\ X = \begin{pmatrix} x_{11} & \cdots & x_{1n} \\ \vdots & \ddots & \vdots \\ x_{m1} & \cdots & x_{mn} \end{pmatrix} & \text{Learning data (explanatory variables)} \\ \beta = \begin{pmatrix} \beta_1 \\ \vdots \\ \beta_n \end{pmatrix} & \text{Model} \\ \|\beta\|_0 & \text{Number of } i \text{ where } ''\beta_i \neq 0'' \text{ holds} \end{pmatrix}$$

However, Formula (1) is hard in terms of non-deterministic polynomial-time (NP-hard) and it is difficult to obtain a solution in a realistic time. To address this, a method of performing a sparse estimation by grid search or L1 regularization has been known.

The grid search involves performing an exhaustive search for all the 0 components of $\beta$ and creating a list of search candidates in advance. Then, a normal regression ($\min_{\beta \in L} \|y - X\beta\|_2^2$) is executed only using the search candidates (L) in the created list.

On the other hand, the L1 regularization is a technique for solving an optimization problem with the normalization term relaxed to the L1 norm as specified in the following Formula (2).

$$\min_{\beta} \|y - X\beta\|_2^2 + \lambda \|\beta\|_1 \quad (2)$$

Examples of the related art include Japanese National Publication of International Patent Application No. 2016-531343, Japanese Laid-open Patent Publication No. 2016-123853, Japanese Laid-open Patent Publication No. 2005-222422, [NPL 1] {Tibshirani, R. (1996), "Regression Shrinkage and Selection via the Lasso," Journal of the Royal Statistical Society, Ser. B, 58, 267-288}.

SUMMARY

According to an aspect of the embodiments, an optimization method includes: partitioning learning data containing objective variables and explanatory variables into a plurality of subsets of data; executing regularization processing on first data to be used for structure extraction of the learning data in each of the partitioned subsets of data, and extracting a first element equal to zero; extracting, as a candidate model, each model in which an error ratio between first multiple regression and second multiple regression is equal to or more than a predetermined value, the first multiple regression being a result of multiple regression on second data which is test data in each of the partitioned subsets of data and is for use to calculate the error ratio of the learning data, the second multiple regression being a result of multiple regression on third data obtained by excluding the first element from the second data; and outputting a model in which zero is substituted for an element that takes zero a predetermined or larger number of times in the extracted candidate models.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 5 is an explanatory diagram for describing annealing on Train data.

FIG. 6 is an explanatory diagram for describing multiple regression with j e R excluded;

FIG. 8 is an explanatory diagram for describing setting of an element to 0.

DESCRIPTION OF EMBODIMENT(S)

However, the aforementioned related arts have a problem that it is difficult to perform the sparse estimation accurately at high speed. For example, in the grid search, when the number of search candidates is increased in order to guarantee a certain degree of accuracy, the number of search candidates increases exponentially, resulting in a vast amount of calculation time. Meanwhile, the L1 regularization results in an approximate solution because the normalization term is relaxed to the L1 norm, and may deteriorate in accuracy in some cases depending on, for example, data bias.

In an aspect, an object is to provide an optimization apparatus, an optimization program, and an optimization method which are capable of performing a sparse estimation accurately at high speed.

According to an embodiment of the present disclosure, it is possible to perform a sparse estimation with high accuracy at high speed.

Hereinafter, with reference to the drawings, description is provided for an optimization apparatus, an optimization method, and an optimization program according to the embodiments. In the embodiments, components having the same function are denoted by the same reference sign, and the redundant description thereof is omitted. The optimization apparatus, the optimization method, and the optimization program described in the following embodiments are merely examples and are not intended to limit embodiments. In addition, the following embodiments may be combined as appropriate to the extent without inconsistency.

[Functional Configuration of Optimization Apparatus]

Figure 1:
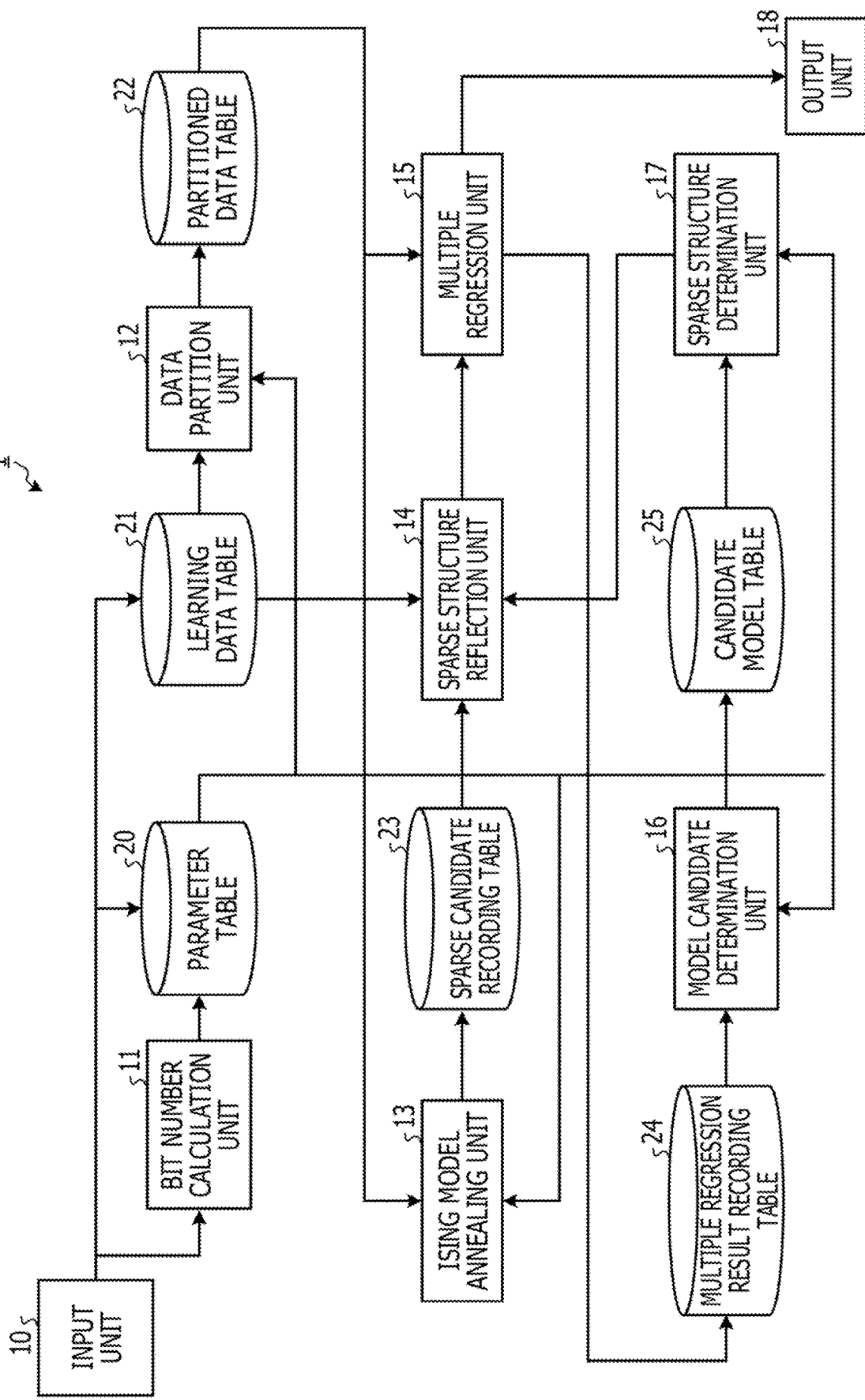
FIG. 1 is a block diagram illustrating a functional configuration of an optimization apparatus according to an embodiment.

FIG. 1 is a block diagram illustrating a functional configuration of an optimization apparatus according to an embodiment. An optimization apparatus 1 illustrated in FIG. 1 receives learning data containing objective variables and explanatory variables. Then, the optimization apparatus 1 performs computation processing on the received learning data for a sparse estimation of solving the optimization problem concerning Formula (1) and thereby extracting a portion where data is sparse (for example, most of the values are a constant ($\approx 0$)).

For instance, the optimization apparatus 1 partitions the input learning data containing the objective variables and explanatory variables into k subsets containing an equal number of elements (hereinafter, referred to as k-partitioning). Next, the optimization apparatus 1 executes regularization processing of L0 regularization on Train (training) data to be used for a structure extraction of the learning data in each of the K-partitioned subsets of data, and extracts elements equal to 0. For instance, the optimization apparatus 1 performs the regularization processing of L0 regularization by annealing data in which Formula (1) is expressed in an ising format based on the Train data, and extracts the elements equal to zero. In this way, the optimization apparatus 1 is capable of optimizing the direct L0 regularization at realistic speed by annealing the data expressed in the ising format.

Next, the optimization apparatus 1 obtains a result of multiple regression on Test (test) data for validation in each of the partitioned subsets of data, and a result of multiple regression on data obtained by excluding the elements equal to 0 from the Test data. Then, the optimization apparatus 1 extracts as a candidate model a model in which an error ratio between the obtained two multiple regression results is equal to or greater than a predetermined value (p). The optimization apparatus 1 outputs a model in which zero is substituted for an element that takes zero a predetermined or larger number of times in the candidate models, which have been extracted by iterating the above processing for all the K-partitioned subsets of data.

In this way, the optimization apparatus 1 is capable of extracting sparsity avoiding data bias by performing the regularization processing of L0 regularization without relaxation to the L1 norm, and thereby performing the sparse estimation with high accuracy. Regarding a functional configuration for achieving the sparse estimation as described above, the optimization apparatus 1 is configured as follows, for example.

For example, the optimization apparatus 1 is a computer such as a server computer. The optimization apparatus 1 may be implemented by a single computer or otherwise be implemented by a computer system including multiple computers. In other words, the configuration of the optimization apparatus 1 described below may be achieved by an information processing system including multiple computers to which the processing is distributed. However, the present embodiment is described by taking, as an example, a case where the optimization apparatus 1 is a single computer.

As illustrated FIG. 1, the optimization apparatus 1 includes an input unit 10, a bit number calculation unit 11, a data partition unit 12, an ising model annealing unit 13, a sparse structure reflection unit 14, a multiple regression unit 15, a model candidate determination unit 16, a sparse structure determination unit 17, and an output unit 18.

The input unit 10 is a processing unit that receives input of data for computation such as learning data and parameters. The input unit 10 stores the input learning data in a learning data table 21, and stores the input parameters in a parameter table 20.

The learning data is teacher data for creating a model, containing objective variables (y) such as a meaning of an image in image data for learning, and explanatory variables (X) such as the image (pixel) in the image data for learning, for example. The parameters are various parameters for use in computation.

For example, the parameters stored in the parameter table 20 include a sequence length (l) for use in integer approximation by binary expansion for expression in an ising format, and a sequence $(a_0, \ldots, a_l)$ for the integer approximation of a model. The sequence length (l) is an integer of 1 or more, for example, and may be a value set by a user or alternatively a value calculated by the bit number calculation unit 11 (which will be described in detail later). Meanwhile, the sequence $(a_0, \ldots, a_l)$ includes real numbers set by the user, for example.

In addition, the parameters include coefficients of regularization terms $(\lambda_1, \lambda_2)$, the number of learning data partitions (K), and a ratio of Train data/Test data in the learning data (q: the proportion of the Train data). The coefficients of the regularization terms $(\lambda_1, \lambda_2)$ are real numbers of 0 or more set by the user, for example. The number of learning data partitions (K) is an integer of 1 or more set by the user, for example. When the data is partitioned such that an upper limit and a lower limit of coefficients contained in each subset of the data after the partitioning satisfy a predetermined condition, an iteration number $\text{itr}_{max}$ (an integer of 1 or more) indicating the number of iterations of processing may be included in addition to the number of partitions (k) (which will be described in detail later). The ratio of Train data/Test data in the learning data (q: the proportion of the Train data) is a real number in a range of 0 to 1 set by the user, for example, and q=0.8 or the like is a value often used.

The parameters further include a threshold (p) for use in determination of a model candidate, and a threshold (N) for use in determination of a final model. The threshold (p) is a real number in a range of 0 to 1 set by the user, for example. The threshold (N) is an integer of 1 or more set by the user, for example.

The bit number calculation unit 11 is a processing unit that calculates the number of bits of data in the ising model annealing unit 13, and calculates the number of bits defined as n(l+2), where n is the number of rows in learning data (X) and l is the sequence length for integer approximation. Here, the bit number calculation unit 11 calculates l that is the largest integer satisfying n(l+2)≤Nb, where Nb is the upper limit number of bits in the ising model annealing unit 13. Then, the bit number calculation unit 11 stores the calculated value of l in the parameter table 20 as the sequence length (l) for use in the integer approximation by binary expansion. Thus, the optimization apparatus 1 is capable of performing the integer approximation by using the sequence length (l) that brings the data as close to the upper limit number of bits (Nb) in the annealing as possible.

The data partition unit 12 is a processing unit that performs K-partitioning to partition learning data stored in the learning data table 21 into k subsets of data containing an equal number of elements based on the number of learning data partitions (K) in the parameter table 20. In other words, the data partition unit 12 is an example of a partition unit.

For instance, the data partition unit 12 shuffles the rows in the learning data at random, and partitions the data into k subsets each containing an equal number of elements to obtain the subsets of data. Next, the data partition unit 12 stores the subsets of data obtained by the K-partitioning in a partitioned data table 22.

In this regard, the data partition unit 12 may perform the aforementioned K-partitioning such that the upper limit and the lower limit of coefficients contained in each subset of data after the learning data partitioning satisfy a predetermined condition.

For instance, during the K-partitioning, the data partition unit 12 checks whether the upper limit and the lower limit of the coefficients contained in each subset of data satisfy the predetermined condition. In one example, for x contained in the learning data (X), the data partition unit 12 checks whether $\max_{a,b,c,d} x^{(i)}_{ab} x^{(i)}_{cd} - \min_{a,b,c,d} x^{(i)}_{ab} x^{(i)}_{cd}$ falls into a range of integer values in the upper limit number of bits in the ising model annealing unit 13 (for example, 16-bit integer values). If the predetermined condition is not satisfied, the data partition unit 12 again executes the K-partitioning at random, and iterates the partitioning until the condition is satisfied (up to the number of iterations set as the upper limit at $\text{itr}_{max}$ in the parameter table 20). Thus, the data partition unit 12 is able to partition the data such that the upper limit and the lower limit of coefficients fall into the range of the integer values in the upper limit number of bits in the ising model annealing unit 13.

The ising model annealing unit 13 is a processing unit that performs processing of executing the regularization processing of L0 regularization on the Train data in each of the subsets of data stored in the partitioned data table 22, and extracting an element equal to zero. In other words, the ising model annealing unit 13 is an example of a regularization processing unit.

For instance, the ising model annealing unit 13 reads each of the subsets of data stored in the partitioned data table 22, and takes the Train data by splitting the subset of data based on the ratio of Train data/Test data (q) in the parameter table 20. Next, the ising model annealing unit 13 performs the regularization processing of L0 regularization by annealing data in which β in Formula (1) is expressed in the ising format by integer approximation based on the Train data, and extracts an element equal to zero ($\beta_j=0$). Then, the ising model annealing unit 13 stores the extracted element equal to 0 ($\beta_j=0$) in a sparse candidate recording table 23.

For instance, the ising model annealing unit 13 prepares $\sigma^{(j)i}$ and $\tau_j \in \{0, 1\}$ as ising bits for expressing Formula (1) in the ising format. Here, $\sigma^{(j)i}$ is an ising bit for expressing the model (β). Then, $\tau_j$ is an ising bit for expressing the L0 regularization term.

After that, the ising model annealing unit 13 performs the integer approximation of $\beta_j$ by binary expansion using $f(\sigma^{(j)}_0, \ldots \sigma^{(j)}_l)$. For instance, the ising model annealing unit 13 expresses the model (β) by using the sequence $(a_0, \ldots, a_l)$ in the parameter table 20 as presented in Formula (3).

$$\beta_j \propto a_0 \sigma_0^{(j)} + \ldots + a_l \sigma_l^{(j)} \tag{3}$$

Note that specific example of the sequence usable herein are binary, unary, sequential, and Fibonacci. Binary: $a_i = 2^i$ Unary: $a_i = 1$ Sequential: $a_i = i$ Fibonacci: $a_i = a_{i-1} + a_{i-2}$ In addition, the ising model annealing unit 13 adds $\Sigma_i(1-\tau_j)\sigma_i^{(j)}$ to express "$\tau_j=0$"↔"β=0". According to the above procedure, the ising model annealing unit 13 expresses Formula (1) in the ising format as presented in the following Formula (4).

$$\begin{aligned}\|y - X\beta\|_2^2 &= \sum_i \left(y_i - \sum_j x_{ij} f(\sigma_0^{(j)}, \ldots, \sigma_l^{(j)})\right)^2 \\ \lambda\|\beta\|_0 &= \lambda_1 \sum_j \tau_j + \lambda_2 \sum_{i,j} (1-\tau_j)\sigma_i^{(j)}\end{aligned} \tag{4}$$

Subsequently, the ising model annealing unit 13 optimizes the data expressed based on the Train data in the ising format as in Formula (4) by performing annealing processing (for example, digital annealing (DA)). Next, the ising model annealing unit 13 extracts an element equal to 0 ($\beta_j=0$) from the result of the L0 regularization obtained by the optimization. After that, the ising model annealing unit 13 records j of the element equal to zero ($\beta_j=0$) in the sparse candidate recording table 23.

The sparse structure reflection unit 14 is a processing unit that performs processing of reflecting a sparse structure to the learning data stored in the learning data table 21, based on elements equal to zero recorded in the sparse candidate recording table 23 and a determination result by the sparse structure determination unit 17. For instance, the sparse structure reflection unit 14 sets each element equal to zero (the model $\beta$) to $\beta_j=0$.

The multiple regression unit 15 is a processing unit that performs processing of estimating the model ($\beta$) by performing multiple regression ($\min_\beta \|y - X\beta\|^2_2$) on the subsets of data stored in the partitioned data table 22. The multiple regression unit 15 stores a result (model ($\beta$)) of the multiple regression in a multiple regression result recording table 24.

For example, the multiple regression unit 15 performs the multiple regression on the Test data for validation in each of the subsets of data stored in the partitioned data table 22, and stores the result ($\beta$) of this multiple regression in the multiple regression result recording table 24. In addition, the multiple regression unit 15 performs the multiple regression on data obtained by excluding the elements equal to 0 from the Test data by the sparse structure reflection unit 14 based on the elements equal to zero ($\beta_j=0$) recorded in the sparse candidate recording table 23 (excluding j∈R), and stores the result ($\tilde{\beta}$) of this multiple regression in the multiple regression result recording table 24.

The model candidate determination unit 16 is a processing unit that determines whether or not to set $\tilde{\beta}$ as a candidate model based on an error ratio between the two results ($\beta$, $\tilde{\beta}$) of the multiple regression stored in the multiple regression result recording table 24. For instance, regarding the error ratio between the result ($\beta$) of the multiple regression on the Test data for validation and the result ($\tilde{\beta}$) an of the multiple regression on data obtained by excluding the elements equal to 0 from the Test data, the model candidate determination unit 16 calculates whether or not the following Formula (5) holds. Then, when the error ratio is equal to or more than the threshold (p) in the parameter table 20 (when Formula (5) holds), the model candidate determination unit 16 sets $\tilde{\beta}$ as a candidate model and stores $\tilde{\beta}$ in a candidate model table 25. In other words, the model candidate determination unit 16 is an example of an error ratio calculation unit.

$$\frac{\|y - X\beta\|^2_2}{\|y - X\tilde{\beta}\|^2_2} \geq p \quad (5)$$

The sparse structure determination unit 17 is a processing unit that performs processing of determining a final sparse structure based on the candidate models ($\tilde{\beta}$) stored in the candidate model table 25. For instance, the sparse structure determination unit 17 determines that an element for which the number of $\tilde{\beta}$ where $\tilde{\beta}_j=0$ holds is equal to or more than the threshold (N) in the parameter table 20 is the final sparse structure.

The sparse structure reflection unit 14 outputs a model in which zero is substituted for the element determined as the sparse structure in response to the determination result of the sparse structure determination unit 17. In other words, the sparse structure reflection unit 14 is an example of an output unit.

The multiple regression unit 15 substitutes zero for the element finally determined as the sparse structure by the sparse structure reflection unit 14, and obtains a specific value of the final model ($\beta$) by the multiple regression with exclusion of j where $\beta_j=0$ holds.

The output unit 18 is a processing unit that outputs, as a processing result, the specific value of the final model ($\beta$) obtained with the multiple regression by the multiple regression unit 15.

[Processing Sequence]

Figure 2:
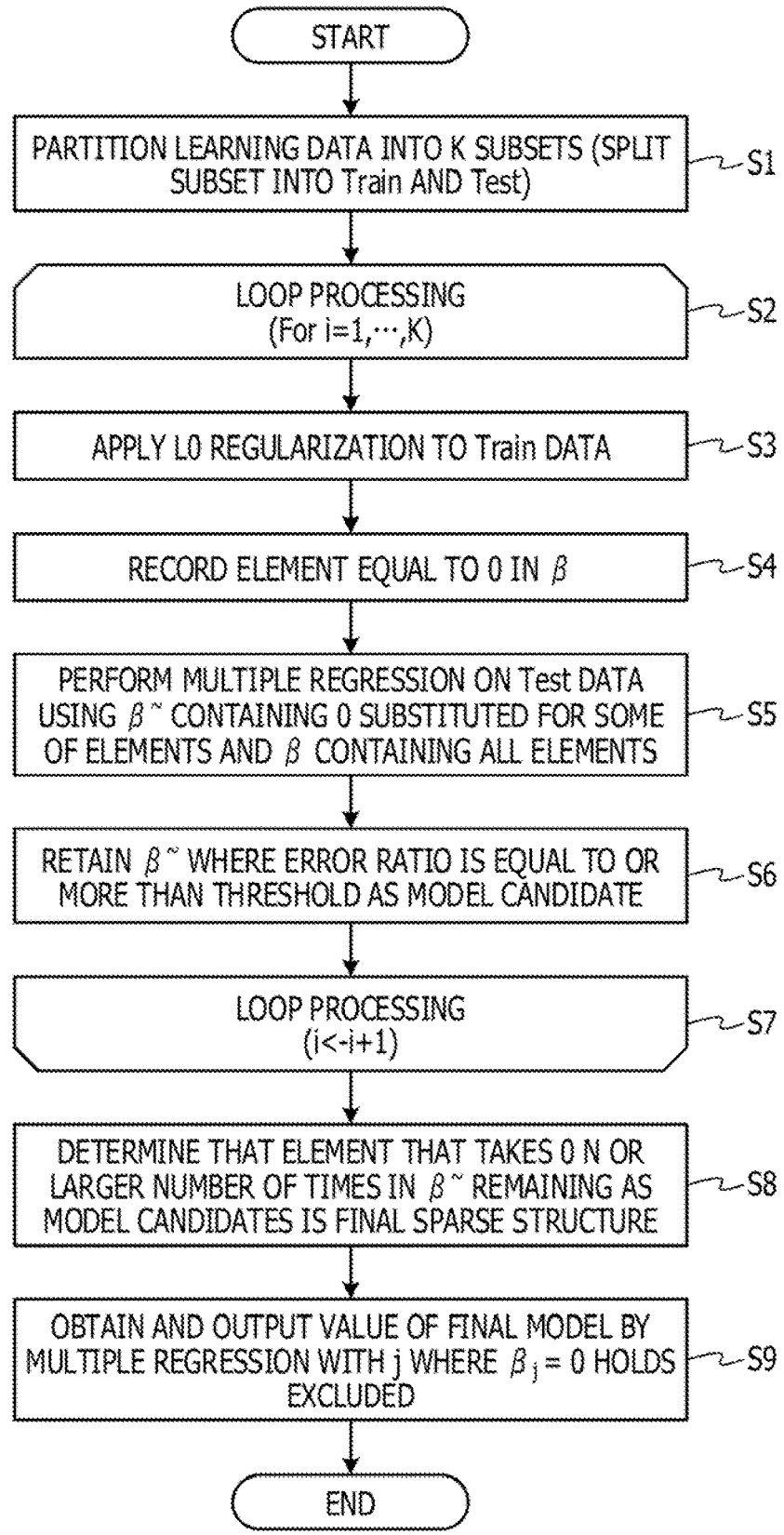
FIG. 2 is a flowchart illustrating an operation example of the optimization apparatus according to an embodiment.

Next, a processing sequence in an optimization method executed by the optimization apparatus 1 is described. FIG. 2 is a flowchart illustrating an operation example of the optimization apparatus 1 according to an embodiment.

As illustrated in FIG. 2, at the start of the processing, the data partition unit 12 performs K-partitioning of learning data containing objective variables (y) and explanatory variables (X) (S1).

Figure 3:
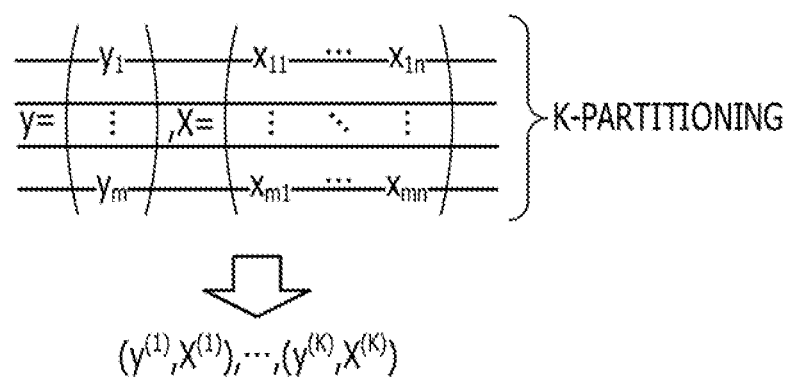
FIG. 3 is an explanatory diagram for describing partitioning of learning data.

FIG. 3 is an explanatory diagram for describing partitioning of learning data. As illustrated in FIG. 3, the data partition unit 12 shuffles the rows of the objective variables (y) and the explanatory variables (X) in the learning data at random, and performs the K-partitioning to partition the data into k subsets each containing an equal number of elements. As a result, the data partition unit 12 obtains the subsets of data ($y^{(1)}$, $X^{(1)}$), . . . , ($y^{(K)}$, $X^{(K)}$).

Figure 4:
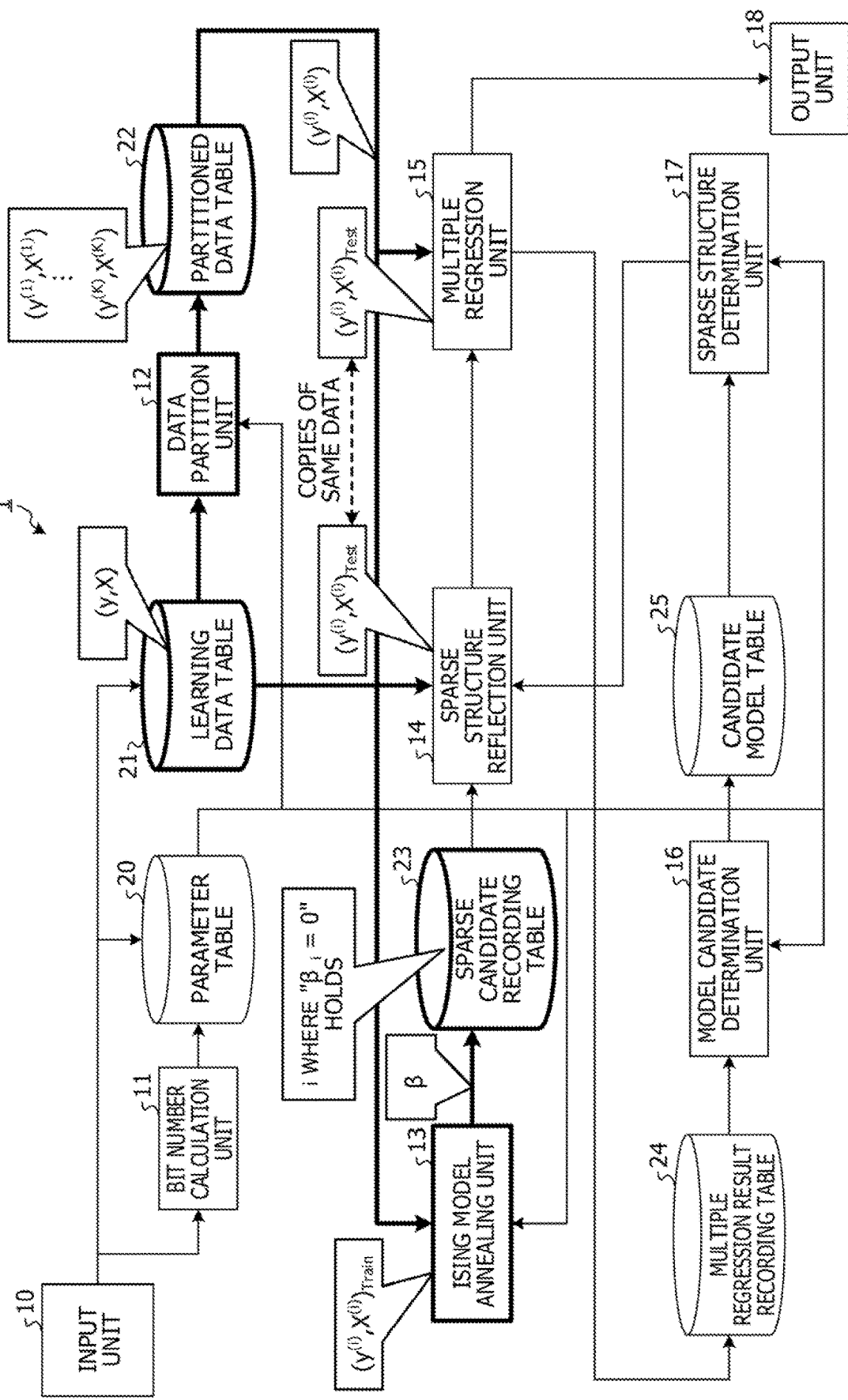
FIG. 4 is an explanatory diagram for describing operating agents and a data flow.

FIG. 4 is an explanatory diagram for describing operating agents and a data flow. More specifically, in FIG. 4, the operating agents and the data flow concerning S1 to S4 in FIG. 2 are indicated by bold letters and lines. As illustrated in FIG. 4, in S1, the data partition unit 12 stores the obtained subsets of data ($y^{(1)}$, $X^{(1)}$), . . . , ($y^{(K)}$, $X^{(K)}$) in the partitioned data table 22.

Next, the optimization apparatus 1 executes loop processing in S2 to S7 for each of the subsets of data ($y^{(i)}$, $X^{(i)}$) (For i=1, . . . , K, i<-i+1).

At the start of the loop processing, the ising model annealing unit 13 executes L0 regularization-applied annealing (digital annealing: DA) on the Train data (($y^{(i)}$, $X^{(i)}$)$_{Train}$) that is q×100 percent of each subset of data ($y^{(i)}$, $X^{(i)}$).

FIG. 5 is an explanatory diagram for describing the annealing on the Train data. As illustrated in FIG. 5, the subset of data ($y^{(i)}$, $X^{(i)}$) is split into the Train data and the Test data based on the ratio (q) of Train data/Test in the parameter table 20. Then, the ising model annealing unit 13 performs the digital annealing on the Train data, and extracts an element equal to 0 ($\beta_j=0$).

After that, the ising model annealing unit 13 records the element equal to 0 in $\beta$ obtained by the annealing in the sparse candidate recording table 23 (S4). For instance, as illustrated in FIG. 4, the ising model annealing unit 13 records j where "$\beta_j=0$" holds in the sparse candidate recording table 23.

Then, the multiple regression unit 15 performs the multiple regression on the Test data (($y^{(i)}$, $X^{(i)}$)$_{Test}$) in the subset of data in terms of $\tilde{\beta}$ containing the elements partially substituted with 0 and $\beta$ containing all the elements (S5).

For instance, in S5, the multiple regression unit 15 obtains the model ($\beta$) by performing normal multiple regression ($\min_\beta \|y - X\beta\|^2_2$) on the Test data (($y^{(i)}$, $X^{(i)}$)$_{Test}$).

In addition, the multiple regression unit 15 obtains the model ($\beta^\sim$) by performing multiple regression ($\min_{\beta^\sim} \|y - X\beta^\sim\|^2_2$) on the Test data (($y^{(i)}$, $X^{(i)}$)$_{Test}$) with partial exclusion (excluding j∈R).

FIG. 6 is an explanatory diagram for describing the multiple regression with exclusion of j∈R. As illustrated in FIG. 6, in the multiple regression with exclusion of j∈R, the multiple regression is performed on the Test data (($y^{(i)}$, $X^{(i)}$)$_{Test}$) from which each element (j) equal to 0 extracted by the ising model annealing unit 13 is excluded.

Figure 7:
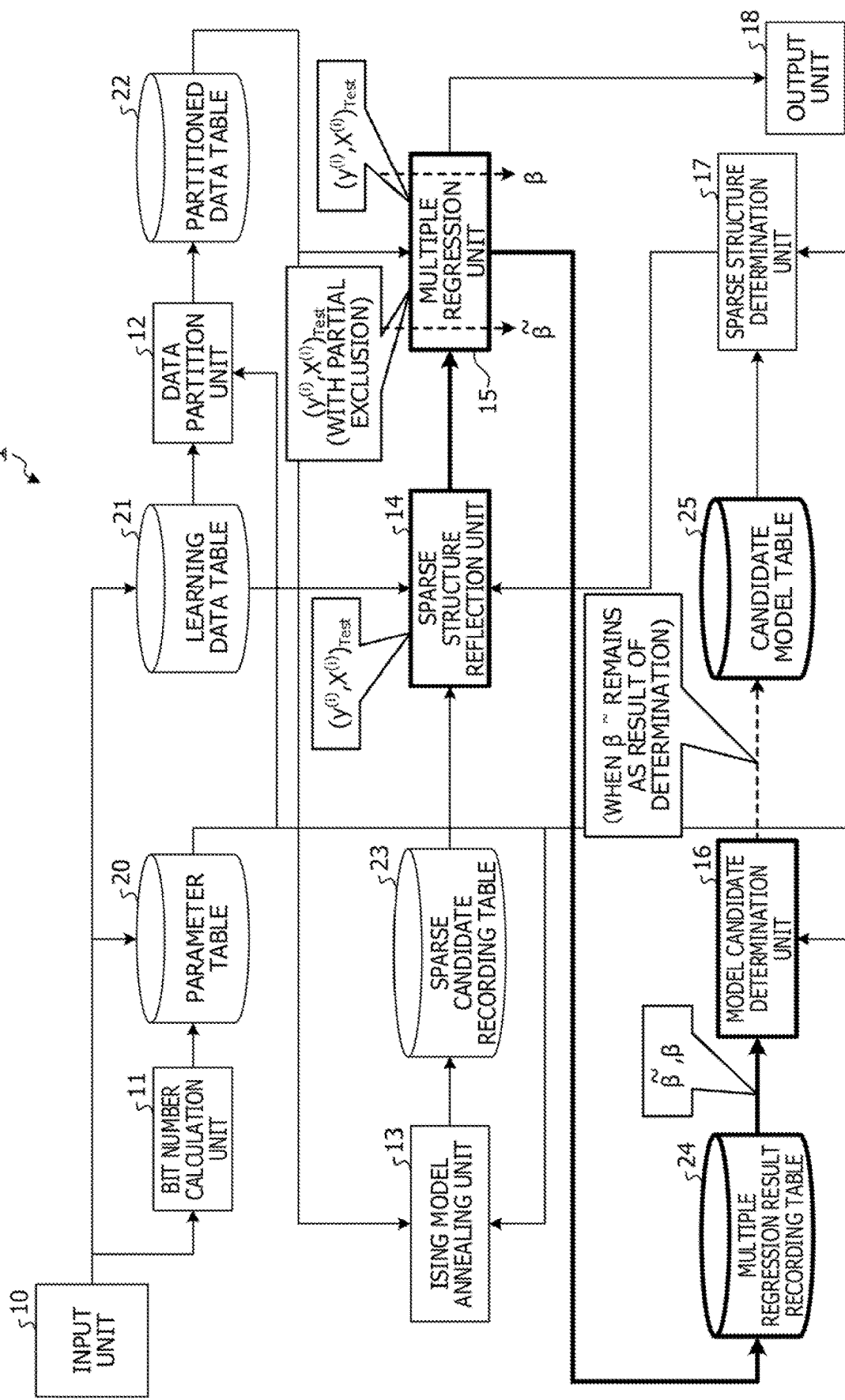
FIG. 7 is an explanatory diagram for describing operating agents and a data flow.

FIG. 7 is an explanatory diagram for describing operating agents and a data flow. More specifically, in FIG. 7, the operating agents and the data flow concerning S5 and S6 in FIG. 2 are indicated by bold letters and lines.

As illustrated in FIG. 7, in S5, the multiple regression unit 15 obtains the model ($\beta$) by the normal multiple regression on the Test data (($y^{(i)}$, $X^{(i)}$)$_{Test}$). In addition, the multiple regression unit 15 obtains the model ($\beta^\sim$) by the multiple regression on the Test data (($y^{(i)}$, $X^{(i)}$)$_{Test}$) with partial exclusion (excluding j∈R). Then, the multiple regression unit 15 stores the obtained models ($\beta$, $\beta^\sim$) in the multiple regression result recording table 24.

After that, based on the error ratio between the two results ($\beta$, $\beta^\sim$) of the multiple regressions stored in the multiple regression result recording table 24, the model candidate determination unit 16 retains, in the candidate model table 25, the model $\beta^\sim$ in which the error ratio is equal to or more than the threshold, as a model candidate (S6).

The optimization apparatus 1 terminates the aforementioned loop processing in S2 to S7 after the loop processing is performed for all the subsets of data. Through this processing, the models $\beta^\sim$ remaining the model candidates as the results of the determination for all the subsets of data by the model candidate determination unit 16 are stored in the candidate model table 25.

Subsequent to the loop processing, the sparse structure determination unit 17 determines that each element that takes 0 a number of times equal to or more than the threshold (N) in the parameter table 20 in the models $\beta^\sim$ stored in the candidate model table 25 and remaining as the model candidates is the final sparse structure. The sparse structure reflection unit 14 outputs a model with a final sparse structure, that is, a model in which the elements determined as the sparse structure are set to 0 based on the determination result of the sparse structure determination unit 17 (S8).

FIG. 8 is an explanatory diagram for describing setting of an element to 0. As illustrated in FIG. 8, in $\beta^\sim(1)$ to $\beta^\sim(K)$, the number of $\beta^\sim$ in which $\beta^1$ is equal to 0 is equal to or more than N. Such $\beta^1$ is determined as the final sparse structure and is set as $\beta_1 = 0$.

Next, the multiple regression unit 15 sets the elements finally determined as the sparse structure by the sparse structure reflection unit 14 to 0, and obtains the specific value of the final model ($\beta$) by the multiple regression with exclusion of the elements of j where $\beta_j = 0$ holds. Then, the output unit 18 outputs, as a processing result, the value of the final model ($\beta$) obtained with the multiple regression by the multiple regression unit 15 (S9).

Figure 9:
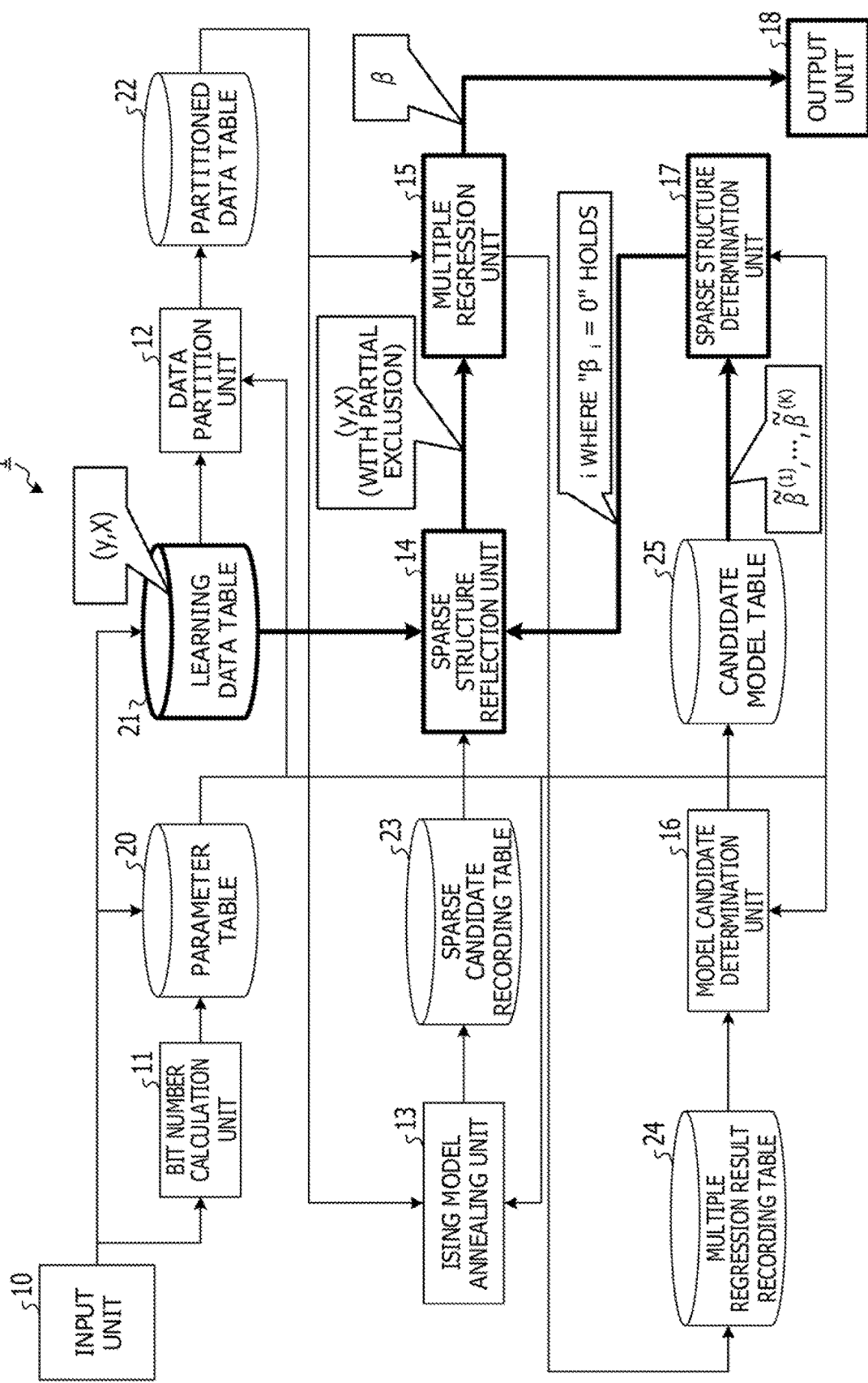
FIG. 9 is an explanatory diagram for describing operating agents and a data flow.

FIG. 9 is an explanatory diagram for describing operating agents and a data flow. More specifically, in FIG. 9, the operating agents and the data flow concerning S8 and S9 in FIG. 2 are indicated by bold letters and lines. As illustrated in FIG. 9, the multiple regression unit 15 obtains the specific value of the final model ($\beta$) by the multiple regression on the learning data (y, X) in the learning data table 21 in which the elements finally determined as the sparse structure by the sparse structure reflection unit 14 are set to 0 (with partial exclusion). Then, the output unit 18 outputs the value of $\beta$ obtained by the multiple regression unit 15.

[Effects]

The optimization apparatus 1 includes the data partition unit 12, the ising model annealing unit 13, the model candidate determination unit 16, and the sparse structure reflection unit 14 as described above. The data partition unit 12 partitions learning data input from the input unit 10 and containing objective variables and explanatory variables into multiple subsets of data. The ising model annealing unit 13 executes the regularization processing of L0 regularization on the Train data (first data) to be used for a structure extraction of the learning data in each of the partitioned subsets of data, and extracts an element equal to zero (first element). For instance, the ising model annealing unit 13 performs the regularization processing of L0 regularization by annealing data in which $\beta$ is expressed in the ising format by integer approximation based on the Train data, and extracts an element where $\beta_j = 0$ holds.

The model candidate determination unit 16 extracts, as a candidate model, a model ($\beta^\sim$) in which the error ratio between the result of the multiple regression on the Test data (second data) in each of the partitioned subsets of data and the result of the multiple regression on data obtained by excluding the element where $\beta_j = 0$ holds from the Test data is equal to or more than the predetermined value (p). The sparse structure reflection unit 14 outputs a model in which zero is substituted for an element that takes zero a predetermined number (N) or larger number of times in the extracted candidate models ($\beta^\sim$).

In this way, the optimization apparatus 1 is capable of extracting sparsity avoiding data bias by performing the regularization processing of L0 regularization without relaxation to the L1 norm, and thereby performing the sparse estimation with high accuracy. In addition, the optimization apparatus 1 is capable of optimizing the direct L0 regularization at realistic speed by annealing the data expressed in the ising format based on the Train data.

Moreover, when l denotes the sequence length to be used in the binary expansion for expression in the ising format, Nb denotes the upper limit number of bits in the annealing, and n denotes the number of the rows in the learning data, the bit number calculation unit 11 in the optimization apparatus 1 sets the sequence length to be used for the binary expansion to l that is the largest integer satisfying n(l+2)≤Nb. The larger l, the higher the approximation accuracy of the integer approximation in binary expansion. Thus, the optimization apparatus 1 is capable of performing the annealing with higher accuracy by performing the integer approximation with l that brings the data as close to the upper limit number of bits (Nb) in the annealing as possible.

The data partition unit 12 performs the K-partitioning into k subsets of data such that the upper limit and the lower limit of the coefficients contained in each of the subsets of data after the learning data partitioning satisfy the predetermined condition. For each subset of data (x) after the learning data partitioning, the upper limit/the lower limit of the coefficients are given as $\max_{a,b,c,d} x^{(i)}_{ab} x^{(i)}_{cd} / \min_{a,b,c,d} x^{(i)}_{ab} x^{(i)}_{cd}$ when the ising model annealing unit 13 executes the L0 regularization by the annealing. These coefficients are required to fall into a range of integer values in the upper limit number of bits (Nb: for example, 16 bits) in the ising model annealing unit 13. Thus, when the data partition unit 12 partitions the learning data such that the upper limit and the lower limits of the coefficients satisfy the predetermined condition, or for example, $\max_{a,b,c,d} x^{(i)}_{ab} x^{(i)}_{cd} - \min_{a,b,c,d} x^{(i)}_{ab} x^{(i)}_{cd}$ falls into a range of 16-bit integer values, the ising model annealing unit 13 is capable of performing the annealing within the range of the integer values in the upper limit number of bits.

[Others]

The constituent elements of the apparatuses illustrated in the drawings are functionally conceptual ones and do not necessarily have to be physically configured as illustrated. Specific forms in which the constituent elements of the apparatuses are separated or integrated are not limited to the illustrated forms, and all or part thereof may be functionally or physically separated or integrated in any unit depending on various factors such as load and usage conditions. For example, the processing units serving as the input unit 10, the bit number calculation unit 11, the data partition unit 12, the ising model annealing unit 13, the sparse structure reflection unit 14, the multiple regression unit 15, the model candidate determination unit 16, the sparse structure determination unit 17, and the output unit 18 may be integrated as appropriate. On the other hand, the processing performed by each processing unit may be appropriately separated into subunits of the processing to be performed by multiple processing units. All or given some of the processing functions performed by the processing units may be implemented by a central processing unit (CPU) and a program to be analyzed and executed by the CPU, or may be implemented as hardware by wired logic.

[Optimization Program]

Figure 10:
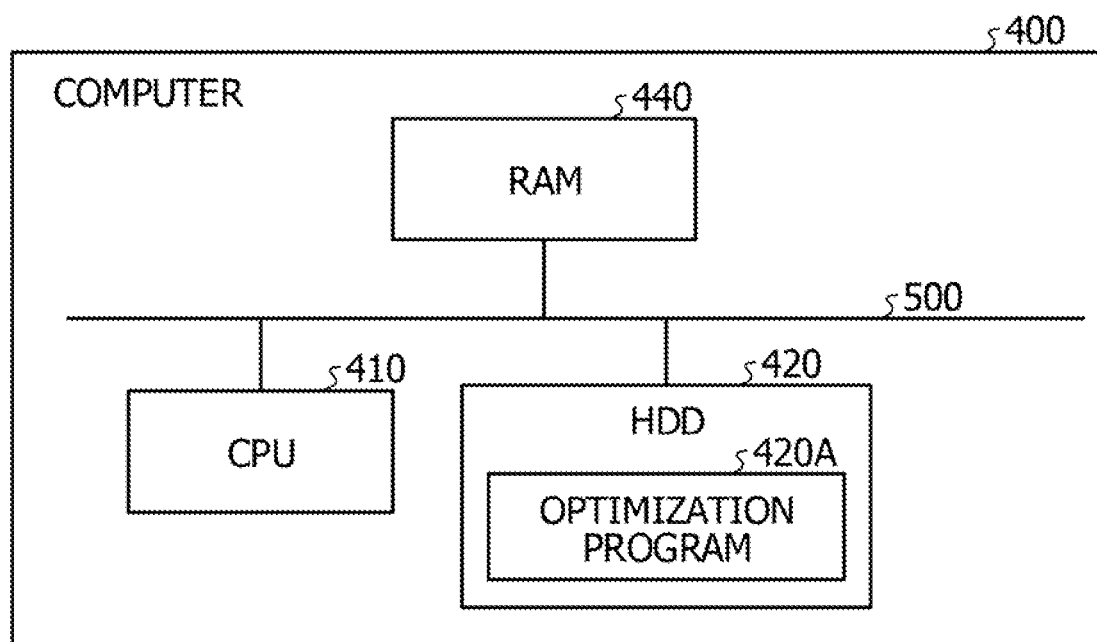
FIG. 10 is a diagram illustrating a configuration example of a computer for executing an optimization program.
Figure 11:
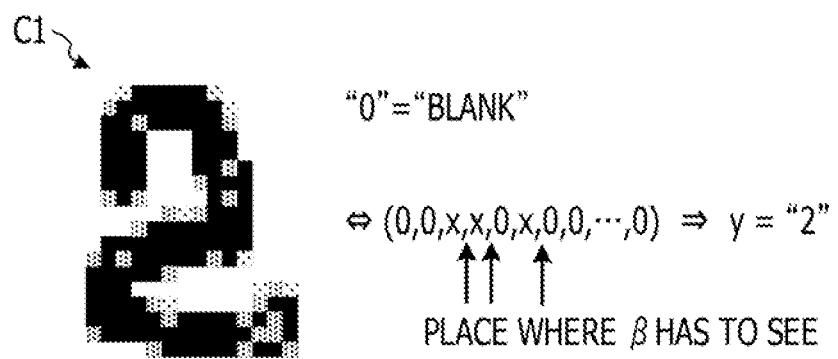
FIG. 11 is an explanatory diagram for describing why sparsity is required in multiple regression.
Figure 11:
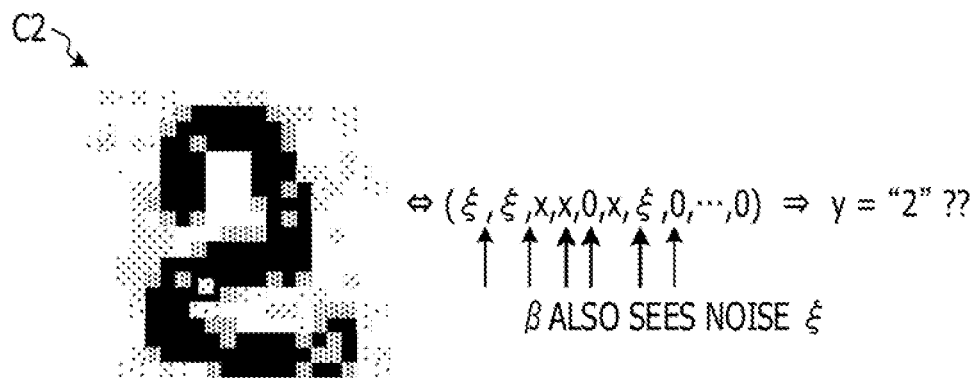

In addition, various kinds of the processing described in the above embodiments may also be attained by executing a prepared program on a computer system such as a personal computer or a workstation. Therefore, an example of a computer system that executes an optimization program is described below. FIG. 10 is a diagram illustrating an example of the configuration of a computer that executes the optimization program.

As illustrated in FIG. 10, a computer 400 has a CPU 410, a hard disk drive (HDD) 420, and a random-access memory (RAM) 440. These units 400 to 440 are coupled to each other via a bus 500.

The HDD 420 stores in advance an optimization program 420A that exerts the same functions as those of the input unit 10, the bit number calculation unit 11, the data partition unit 12, the ising model annealing unit 13, the sparse structure reflection unit 14, the multiple regression unit 15, the model candidate determination unit 16, the sparse structure determination unit 17, and the output unit 18. It is to be noted that the optimization program 420A may be separated as desired.

The HDD 420 also stores various kinds of information. For example, the HDD 420 stores an operating system (OS), various programs, and various kinds of information related to the parameter table 20, the learning data table 21, the partitioned data table 22, the sparse candidate recording table 23, the multiple regression result recording table 24, and the candidate model table 25.

By reading the optimization program 420A from the HDD 420 and executing the optimization program 420A, the CPU 410 operates processes that execute the processing units in the aforementioned embodiments. In other words, the processes execute the same operations as those of the input unit 10, the bit number calculation unit 11, the data partition unit 12, the ising model annealing unit 13, the sparse structure reflection unit 14, the multiple regression unit 15, the model candidate determination unit 16, the sparse structure determination unit 17, and the output unit 18.

The aforementioned optimization program 420A may be stored in a "portable physical medium" such for example as a flexible disk (FD), a compact disc read-only memory (CD-ROM), a digital versatile disc (DVD), a magneto-optical disk, or an integrated circuit (IC) card, which will be inserted into the computer 400. Then, the computer 400 may read the optimization program 420A from such a medium and execute the optimization program 420A.

Otherwise, the optimization program 420A may be stored in "another computer (or Server)" or the like coupled to the computer 400 via a public network, the Internet, a local area network (LAN), a wide area network (WAN), or the like. Then, the computer 400 may read the optimization program 420A from the computer or server and execute the optimization program 420A.

Further, the following appendices will be disclosed regarding the above embodiments.

APPENDIX 1

An optimization apparatus comprising:
a partition unit that partitions learning data containing objective variables and explanatory variables into a plurality of subsets of data;
a regularization processing unit that executes regularization processing on first data to be used for structure extraction of the learning data in each of the partitioned subsets of data, and extracts a first element equal to zero;
an error ratio calculation unit that extracts, as a candidate model, each model in which an error ratio between first multiple regression that is a result of multiple regression on second data which is test data in each of the partitioned subsets of data and is for use to calculate the error ratio of the learning data, and second multiple regression that is a result of multiple regression on third data obtained by excluding the first element from the second data is equal to or more than a predetermined value; and
an output unit that outputs a model in which zero is substituted for an element that takes zero a predetermined or larger number of times in the extracted candidate models.

APPENDIX 2

The optimization apparatus according to appendix 1, wherein
the regularization processing unit performs the regularization processing by annealing data expressed in an ising format based on the first data.

APPENDIX 3

The optimization apparatus according to appendix 2, further comprising
a calculation unit that sets, when l denotes a sequence length to be used in binary expansion for expression in the ising format, Nb denotes an upper limit number of bits in the annealing, and n denotes the number of rows in the learning data, the sequence length to be used for the binary expansion to l that is the largest integer satisfying $n(l+2) \leq Nb$.

APPENDIX 4

The optimization apparatus according to any one of appendices 1 to 3, wherein
the partition unit partitions the learning data into the subsets of data such that an upper limit and a lower limit of coefficients contained in each of the subsets of data after the learning data partitioning satisfy a predetermined condition.

APPENDIX 5

An optimization method causing a computer to execute processing comprising:

partitioning learning data containing objective variables and explanatory variables into a plurality of subsets of data;

executing regularization processing on first data to be used for structure extraction of the learning data in each of the partitioned subsets of data, and extracting a first element equal to zero;

extracting, as a candidate model, each model in which an error ratio between first multiple regression that is a result of multiple regression on second data which is test data in each of the partitioned subsets of data and is for use to calculate the error ratio of the learning data, and second multiple regression that is a result of multiple regression on third data obtained by excluding the first element from the second data is equal to or more than a predetermined value; and outputting a model in which zero is substituted for an element that takes zero a predetermined or larger number of times in the extracted candidate models.

APPENDIX 6

The optimization method according to appendix 5, wherein
the extracting the first element involves performing the regularization processing by annealing data expressed in an ising format based on the first data.

APPENDIX 7

The optimization method according to appendix 6, further causing the computer to execute processing comprising:
setting, when l denotes a sequence length to be used in binary expansion for expression in the ising format, Nb denotes the upper limit number of bits in the annealing, and n denotes the number of rows in the learning data, the sequence length to be used for the binary expansion to l that is the largest integer satisfying $n(l+2) \leq Nb$.

APPENDIX 8

The optimization method according to any one of appendices 5 to 7, wherein
the partitioning involves partitioning the learning data into the subsets of data such that an upper limit and a lower limit of coefficients contained in each of the subsets of data after the learning data partitioning satisfy a predetermined condition.

APPENDIX 9

An optimization program causing a computer to execute processing comprising:
partitioning learning data containing objective variables and explanatory variables into a plurality of subsets of data;
executing regularization processing on first data to be used for structure extraction of the learning data in each of the partitioned subsets of data, and extracting a first element equal to zero;
extracting, as a candidate model, each model in which an error ratio between first multiple regression that is a result of multiple regression on second data which is test data in each of the partitioned subsets of data and is for use to calculate the error ratio of the learning data, and second multiple regression that is a result of multiple regression on third data obtained by excluding the first element from the second data is equal to or more than a predetermined value; and outputting a model in which zero is substituted for an element that takes zero a predetermined or larger number of times in the extracted candidate models.

APPENDIX 10

The optimization program according to appendix 9, wherein
the extracting the first element involves performing the regularization processing by annealing data expressed in an ising format based on the first data.

APPENDIX 11

The optimization program according to appendix 10, wherein
the program further causes the computer to execute processing comprising setting, when l denotes a sequence length to be used in binary expansion for expression in the ising format, Nb denotes the upper limit number of bits in the annealing, and n denotes the number of rows in the learning data, the sequence length to be used for the binary expansion to l that is the largest integer satisfying $n(l+2) \leq Nb$.

APPENDIX 12

The optimization program according to any one of appendices 9 to 11, wherein
the partitioning involves partitioning the learning data into the subsets of data such that an upper limit and a lower limit of coefficients contained in each of the subsets of data after the learning data partitioning satisfy a predetermined condition.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:
1. An optimization apparatus comprising:
a memory; and
a processor coupled to the memory, the processor being configured to perform processing including:
partitioning learning data containing objective variables and explanatory variables into a plurality of subsets of data;
executing regularization processing on first data to be used for structure extraction of the learning data in each of the partitioned subsets of data, and extracting a first element equal to zero;
extracting, as a candidate model, each model in which an error ratio between first multiple regression and second multiple regression is equal to or more than a predetermined value, the first multiple regression being a result of multiple regression on second data which is test data in each of the partitioned subsets of data and is for use to calculate the error ratio of the learning data, the second multiple regression being a result of mul- tiple regression on third data obtained by excluding the first element from the second data; and outputting a model in which zero is substituted for an element that takes zero a predetermined or larger number of times in the extracted candidate models.

2. The optimization apparatus according to claim 1, wherein the executing of regularization processing is configured to perform the regularization processing by annealing data expressed in an ising format based on the first data.

3. The optimization apparatus according to claim 2, the processing further comprising setting, when l denotes a sequence length to be used in binary expansion for expression in the ising format, Nb denotes an upper limit number of bits in the annealing, and n denotes the number of rows in the learning data, the sequence length to be used for the binary expansion to l that is the largest integer satisfying $n(l+2) \leq Nb$.

4. The optimization apparatus according to claim 1, wherein the partitioning is configured to partition the learning data into the subsets of data such that an upper limit and a lower limit of coefficients contained in each of the subsets of data after the learning data partitioning satisfy a predetermined condition.

5. An optimization method comprising:

partitioning learning data containing objective variables and explanatory variables into a plurality of subsets of data;

executing regularization processing on first data to be used for structure extraction of the learning data in each of the partitioned subsets of data, and extracting a first element equal to zero;

extracting, as a candidate model, each model in which an error ratio between first multiple regression and second multiple regression is equal to or more than a predetermined value, the first multiple regression being a result of multiple regression on second data which is test data in each of the partitioned subsets of data and is for use to calculate the error ratio of the learning data, the second multiple regression being a result of multiple regression on third data obtained by excluding the first element from the second data; and outputting a model in which zero is substituted for an element that takes zero a predetermined or larger number of times in the extracted candidate models.

6. A non-transitory computer-readable storage medium for storing an optimization program which causes a processor to perform processing for object recognition, the processing comprising:

partitioning learning data containing objective variables and explanatory variables into a plurality of subsets of data;

executing regularization processing on first data to be used for structure extraction of the learning data in each of the partitioned subsets of data, and extracting a first element equal to zero;

extracting, as a candidate model, each model in which an error ratio between first multiple regression and second multiple regression is equal to or more than a predetermined value, the first multiple regression being a result of multiple regression on second data which is test data in each of the partitioned subsets of data and is for use to calculate the error ratio of the learning data, the second multiple regression being a result of multiple regression on third data obtained by excluding the first element from the second data; and outputting a model in which zero is substituted for an element that takes zero a predetermined or larger number of times in the extracted candidate models.

\* \* \* \* \*